United States Patent [19]

Rowe

[11] Patent Number: 5,157,584
[45] Date of Patent: Oct. 20, 1992

[54] POWER DISTRIBUTION APPARATUS WITH "H" SHAPED BUS BAR ARRANGEMENTS

[75] Inventor: Neal E. Rowe, Asheville, N.C.

[73] Assignee: Westinghouse Electric Corp., Pittsburgh, Pa.

[21] Appl. No.: 678,767

[22] Filed: Apr. 1, 1991

[51] Int. Cl.$^5$ ............................................... H02B 1/20
[52] U.S. Cl. ................................. 361/355; 174/71 B;
174/129 B; 361/361; 439/212
[58] Field of Search ............... 361/334, 341, 342, 355,
361/356, 361, 358; 174/70 B, 88 B, 99 B, 71 B,
129 B, 133 B; 439/212, 213, 214, 723, 724

[56] References Cited

U.S. PATENT DOCUMENTS

| | | | |
|---|---|---|---|
| 4,025,826 | 5/1977 | Wilson | 361/334 |
| 4,142,224 | 2/1979 | Wilson | 361/356 |
| 4,178,624 | 12/1979 | Wilson | 361/341 |
| 4,180,845 | 12/1979 | Shariff | 174/133 B |
| 4,361,724 | 11/1982 | Olashaw | 174/129 B |
| 4,374,405 | 2/1983 | Olashaw | 361/355 |

Primary Examiner—Gerald P. Tolin
Attorney, Agent, or Firm—M. J. Moran

[57] ABSTRACT

A vertical bus bar arrangement has three phases, each consisting of two U-shaped members disposed to form an H-configuration and a flat, rectangular bar spaced away from and on each side of the H-configuration. Insulator members are arranged between the bus bar arrangement and the brace members. The insulator members have extended portions raised away from the surface of the bus bars for receiving part of the two interconnected barrier members. The insulator members and a substantial portion of the barrier members form a labyrinth between phases. The barrier members have knockout portions for the electrical connections of the bus bars, and also portions for covering the raw edges of the bus bars in the areas through which the runbacks extend. The crossbars are connected to the bus bars by at least two connectors, one of which extends in the gap formed by the connectors of the bus bars, and one of which extends alongside the flat bar and parallel to the first connector. Flanges of the connectors are connected to the crossbars.

12 Claims, 5 Drawing Sheets

POWER DISTRIBUTION APPARATUS WITH "H" SHAPED BUS BAR ARRANGEMENTS

BACKGROUND OF THE INVENTION

1. Field of the Invention

This invention relates to a power distribution apparatus, and more particularly, to an improved vertical riser bus bar arrangement, an improved insulated brace arrangement, and an improved barrier arrangement.

2. Description of the Prior Art

In a switchboard or switch gear of a power distribution apparatus, a vertical riser arrangement distributes three phase power down a vertical stack of circuit breakers. The power rating capacity is determined, in part, by the design of the vertical riser bus bar arrangement.

Current vertical riser designs which may be employed in a motor control center may consist of a flat, rectangular member whose electrical capacity may be increased by attaching one or more metal bars in surface-to-surface contact with the horizontal member. An example is disclosed in U.S. Pat. No. 4,178,624 issuing on Dec. 11, 1979, in which one of the inventors is the inventor of the present invention. Another vertical riser bus bar arrangement, which may be used in a power distribution apparatus, in which the present invention may be employed, may consist of two or more spaced apart straight metal bars.

These current vertical bus bar arrangements are more likely to generate less current rating capacity per cross sectional square inch, and have insufficient surface area for cooling purposes.

Present vertical riser bus bar arrangements may include two barrier members which are in surface to surface contact with the bus bar arrangement, and which are held together by two horizontal brace members bolted together and fastened in the enclosure for the bus bar arrangement. The barrier members are made of an electrical insulating material, extend between each phase of the bus bar arrangement in a labyrinth fashion, and extend coextensively to encase the bus bar arrangement. Such an example for the barrier members and the brace members is disclosed in the aforesaid U.S. Pat. No. 4,178,624.

A power distribution apparatus employing the invention may have a current capacity ranging from 600 to 5,000 amperes. It receives its power from a substation with a current capacity ranging from 4,100 to 13,000 amperes, and directs power to a load center such as a motor control center of U.S. Pat. No. 4,178,624, having a current range of 100 to 2,000 amperes.

In a power distribution apparatus, a barrier arrangement encasing the vertical bus bar arrangement may or may not be used. If a barrier arrangement is used and is designed similar to that disclosed in U.S. Pat. No. 4,178,624, the barrier members extend between the brace arrangement and vertical bus bar arrangement, to provide insulation between the brace and bus bar arrangement which typically are made of metal. If no barrier arrangement is used, then there still must be some type of insulation between the brace and vertical bus bar arrangements. This insulation must be strong enough to withstand short circuit withstand ratings of 100KA to 200KA for 600 volt equipment, and must be designed to allow for the use of a barrier arrangement, if desired.

In a vertical bus bar arrangement of a power distribution apparatus, the electrical connections are made through stabs on the line side, and runbacks on the load side connected to the circuit breakers, and one or more crossbars located on the side of the vertical bus bar arrangement opposite to the circuit breakers. To distribute the three phase power to adjacent enclosures, a barrier arrangement must be designed to accommodate for these several electrical connections and still provide a complete encasement of the vertical bus bar arrangement and sufficient isolation between each of the three phases of the bus bar arrangement.

There is a real need to provide a vertical bus bar arrangement which has an increased current rating per cross sectional square inch with more surface area for cooling capacity.

There is also a need to provide a brace arrangement which is insulated from the vertical bus bar arrangement regardless of whether a barrier arrangement is used or not used, and which is strong enough to withstand the short circuit withstand ratings.

SUMMARY OF THE INVENTION

The present invention has filled the above needs by providing in power distribution apparatus with an improved design for a vertical riser bus bar arrangement, an improved bracing system with a unique design for the insulator members, and improved barrier members whose cross sectional area differs according to its location along the vertical riser to accommodate the electrical connections, and which fits beneath the insulator members for substantial encasement of the vertical riser bus bar arrangement.

The present invention has a plurality of vertical bus bars constituting a three phase arrangement. For a minimum current rating, each phase has a U-shaped member. For a maximum current rating, each phase has two U-shaped members disposed in an H-configuration, with a straight flat bar or planar conductor spaced away from and on each side of the H-configuration to form a gap therebetween. This gap allows for a tap to extend transversely to and in contact with the conductor members in the bus bar arrangement. The tap arrangement may include a first connector having a leg extending into the gap and a flange transverse to the leg and parallel to the crossbars. A second connection may include a leg in contact with the planar conductor along a side opposite to where the tap is formed and having a portion extending parallel to and in contact with the first connector for connection to the crossbars. Several connector plates connect the bus bars to the crossbars, and the members of the bus bar arrangements together. A pair of brace members are used to mount the bus bars in an enclosure of the power distribution apparatus. Two insulator members are disposed between the brace members and the bus bars. These insulator members are made of a thin layer of molded glass with reinforced plastic which insulates the bus bars from the metal brace members, and which are held in surface to surface contact by the brace members. The brace members have identical inlets, and the insulator members are identical, such that the insulator members encase the bus bars, and form a labyrinth between each phase of the vertical riser bus bar arrangement with the inlets of the brace members supporting the labyrinth configuration.

The insulator members have two extended portions, one on either side of the brace members which are raised away from the surface of the bus bars and which extend a predetermined length along the vertical length of the vertical bus bar arrangement.

Two barrier members of an electrically insulative material are also provided which are substantially coextensive with the bus bars in the areas not contacted by the insulator members. The barrier members are disposed to fit beneath the raised extended portions of the insulator members for a substantial encasement of the bus bars by the insulator members and the barrier members.

The barrier members have several sections along their length which can be broken away to allow electrical connections to the crossbars, stabs, and runbacks. These sections for the stabs and crossbars are generally rectangular in cross section; whereas the cross section for most of the remaining length of the barrier members is in a labyrinth configuration similar to the insulator members between the brace members. The section of the barrier members for the runbacks provides a cover for the raw edges of the section of the vertical bus bar through which the runbacks extend.

It is therefore an object of the present invention to provide an improved design and configuration for a vertical bus bar arrangement for selectively changing the current rating with ease and minimum labor.

It is a further object of the present invention to provide a design for the vertical bus bars and their arrangement, whereby the current rating per cross sectional square inch is increased relative to past designs for the bus bars.

It is a further object of the present invention to provide an improved design for the bus bars which provides an increase in surface area and cooling capacity of the system.

It is a further object of the present invention to provide an improved design for the brace members which includes insulator members which can withstand increased short circuit withstand ratings.

It is a further object of the present invention to provide an improved design for the barrier members which provides efficient cooling, and easy access to the bus bars for electrical connections, and which fits underneath the insulator members for substantial encasement of the bus bar arrangement.

It is a further object of the invention to provide insulator members and barrier members which form a labyrinth between the three phases of the bus bar arrangement.

These and other objects of the present invention will be more fully understood and appreciated from the following description of the invention on reference to the illustrations appended thereto.

DETAILED DESCRIPTION OF THE PREFERRED EMBODIMENTS

The invention has particular application in a power distribution apparatus, such as a switchboard/switch gear unit having a current rating of approximately 600 to 5,000 amps. The power distribution apparatus of the present invention receives its power from a substation with an output of approximately 4,160 to 13,000 amps and is connected to a load center such as a motor control center drawing approximately 150 amps to 2,500 amps. The apparatus in which the invention is employed may be housed in a metal cabinet approximately 92 inches high, and may have a plurality of vertically disposed compartments, each having an access door and housing a circuit breaker unit. Each circuit breaker with a current rating of say 3,000 amps may weigh approximately 400 pounds, and is slid into and out of the unit on a track and wheel system.

Several components and principles, and the arrangement and operation of a switchboard unit encompassing the power distribution apparatus of the invention may be similar to a motor control center, such as that disclosed in U.S. Pat. No. 4,178,624. The main differences may lie in the dimensions and the end products for the power distribution apparatus and the motor control center.

Figure 1:
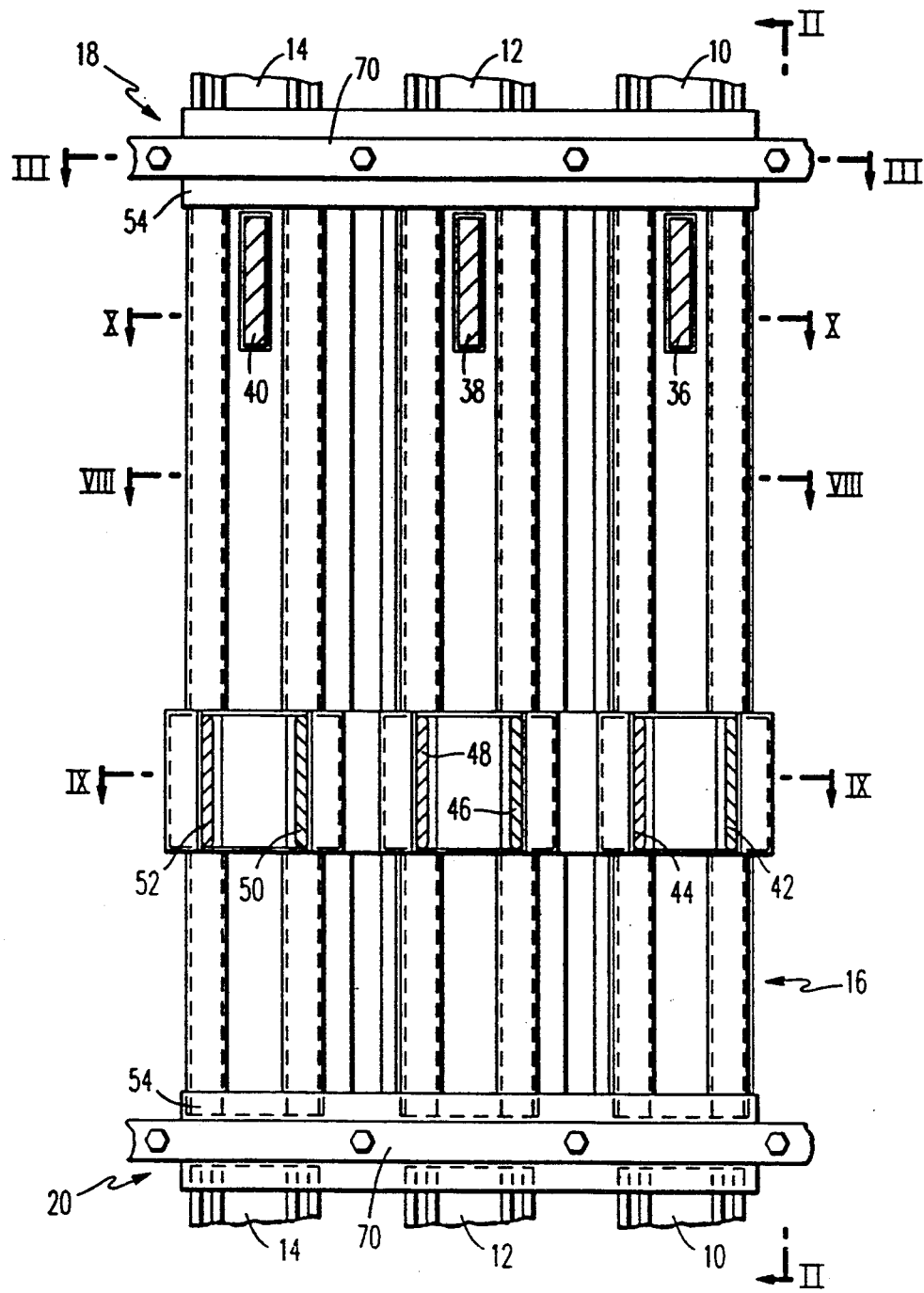
FIG. 1 is an elevational view of a barrier arrangement with a vertical bus bar arrangement and an insulator-brace arrangement at the top and bottom of the barrier arrangement.

Referring first to FIG. 1, there is shown a plurality of spaced vertical bus bar arrangements 10, 12, 14 for a three-phase operation. These bus bar arrangements 10, 12, 14 extend vertically and substantially throughout the length of the enclosure for the switchboard unit. The bus bar arrangements 10, 12, 14 are substantially enclosed or encircled by a barrier arrangement indicated generally at number 16 in FIG. 1.

Figure 2:
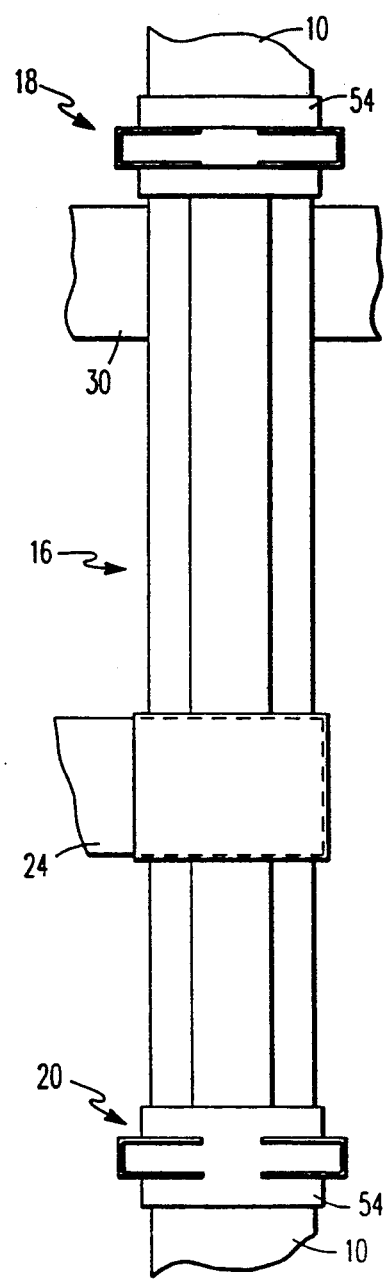
FIG. 2 is a side elevational view taken along lines II—II of FIG. 1.
Figure 3:
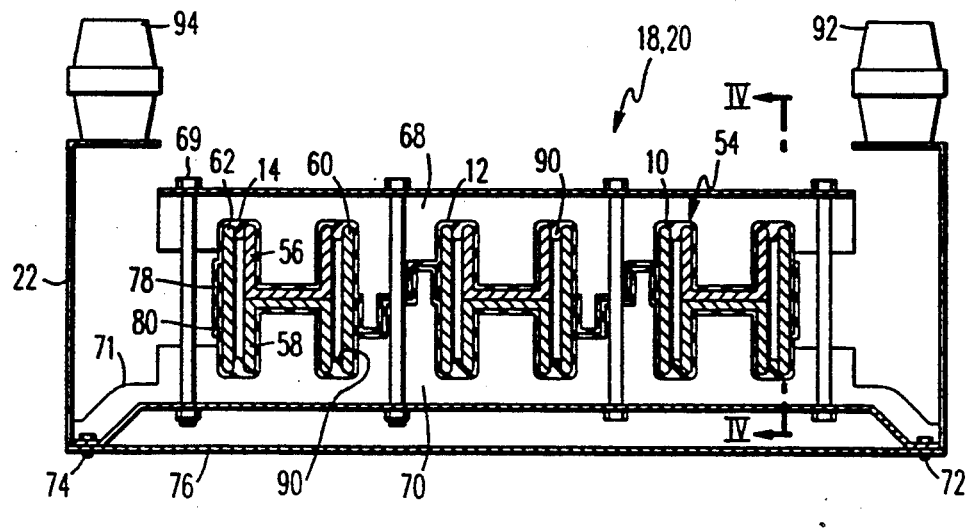
FIG. 3 is a cross sectional plan view showing the brace and insulator members, and a three phase vertical bus bar arrangement, in an enclosure taken along lines III—III of FIG. 1.
Figure 4:
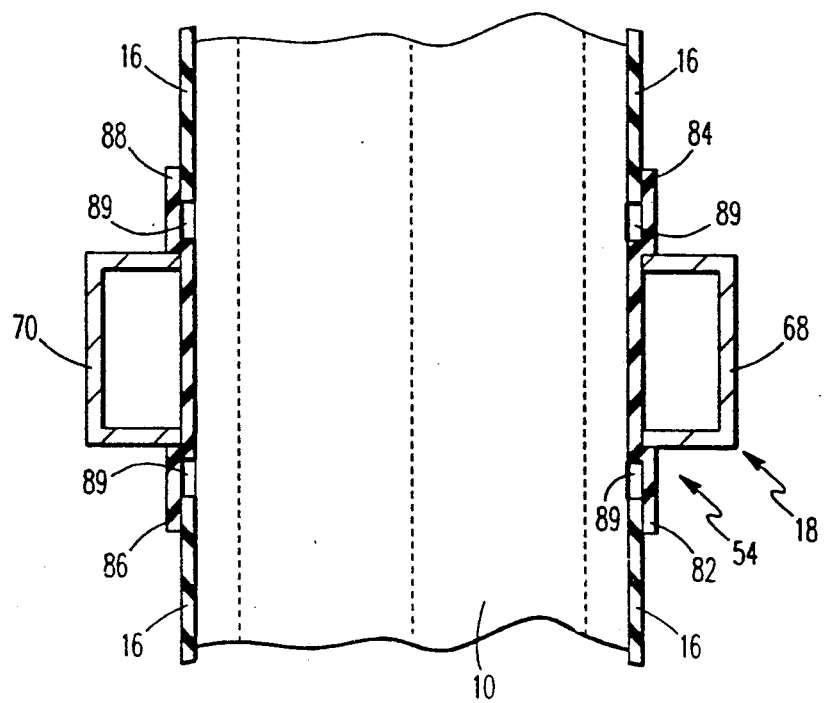
FIG. 4 is an enlarged cross sectional view taken along lines IV—IV of FIG. 3.

As is known, one purpose of the barrier arrangement 16 is to electrically insulate the bus bar arrangements 10, 12, 14 and to increase the safety factor of the switch board unit. The bus bar arrangements 10, 12, 14 are interconnected through the barrier arrangement 16 and a brace arrangement 18, 20. FIGS. 1 and 2 show such brace arrangement 18, 20 located at the upper and lower ends of the barrier arrangement 16. As shown in FIG. 3, brace arrangement 18 is bolted to an inside surface of the housing or enclosure 22 for the switch gear unit in a well-known manner. Even though not shown in FIG. 3, brace arrangement 20 is similarly attached to enclosure 22 as brace arrangement 18. Brace arrangements 18, 20 are best shown in FIGS. 2, 3 and 4, more about which will be discussed hereinafter.

Figure 5:
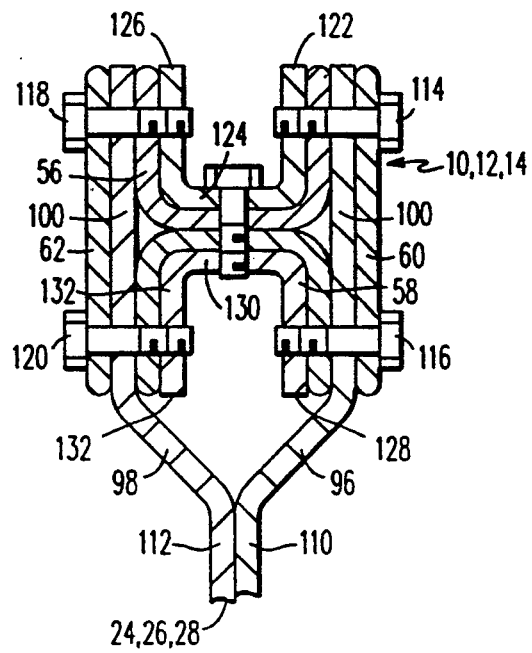
FIG. 5 is an enlarged cross sectional plan view including a stab connection for one phase of the vertical bus bar arrangement.
Figure 6:
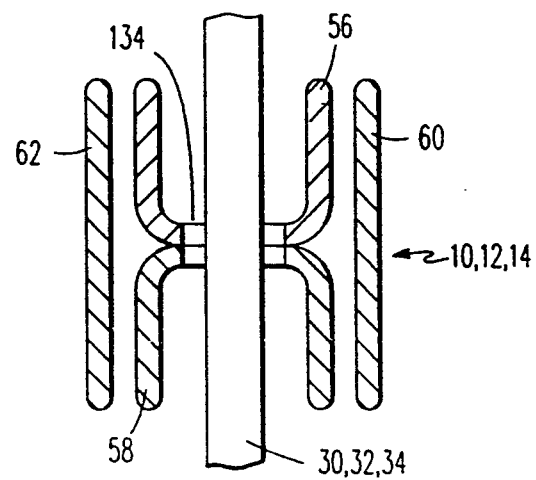
FIG. 6 is an enlarged cross sectional plan view showing a runback connection for one phase of the vertical bus bar arrangement.

Vertical bus bar units 10, 12, 14 are electrically connected to a load center, such as a circuit breaker (not shown) through stabs 24, 26, 28 shown in FIG. 5 which are the line connections, and runbacks 30, 32, 34 shown in FIG. 6 which are the load connections. The barrier arrangement 16 of FIG. 1 provides three spaced apart openings 36, 38, 40 for the runbacks 30, 32, 34, respectively, and six spaced apart openings 42-52 for receiving stabs 24, 26, 28, respectively, more about which will be discussed hereinafter.

Referring particularly to FIGS. 1, 2, and 3 between brace arrangement 18, 20 and bus bar arrangements 10, 12, 14 is an insulator arrangement generally indicated at 54. As shown in FIGS. 2 and 3, this insulator arrangement 54 is constructed to extend beyond brace arrangement 18, 20 and along the vertical length of barrier arrangement 16, and is spaced away from the outer surface of bus bar arrangements 10, 12, 14 in order to allow barrier arrangement 16 to fit under the extended portions of insulator arrangement 54.

Figure 7:
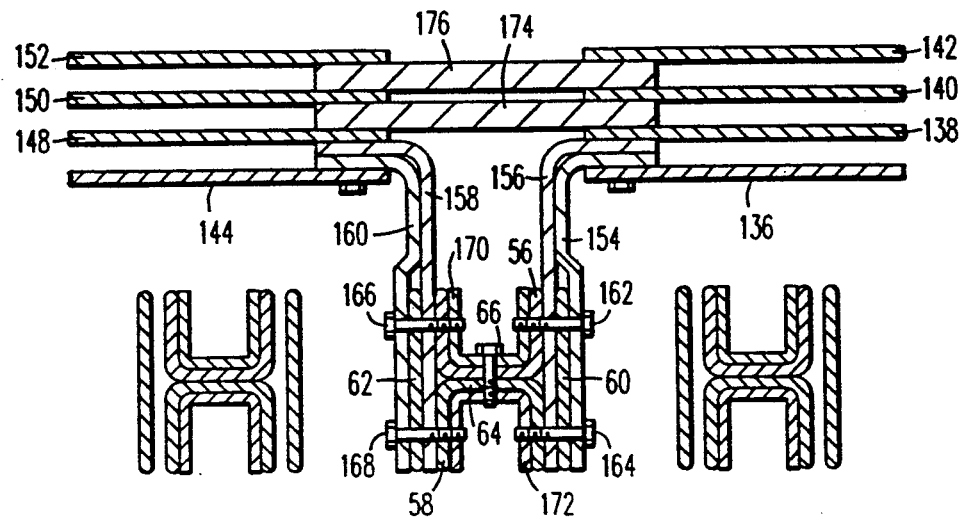
FIG. 7 is an enlarged cross-sectional plan view showing the vertical bus bar arrangement of phase two and its crossbar arrangement with the barrier arrangement not being shown.

Referring particularly to FIG. 3, each bus bar arrangement 10, 12, 14 consists of two U-shaped members 56, 58 arranged back-to-back to form an H-configuration, and two flat, rectangular bars 60, 62 or planar conductors one along each side of the H-configuration. These flat bars 60, 62 or planar conductors are spaced away from members 56, 58 to form a gap, between which a tap extends transversely to contact the spaced apart conductor members 56-62 of bus bar units 10-14. As shown in FIG. 7, the two U-shaped members 56, 58 are fastened together along their length by metal tap plates 64 and bolts 66 in a manner well-known in the industry.

The bus bar arrangements 10, 12, 14 shown in FIGS. 1 and 3 provide the maximum electrical capacity, and are, preferably, extruded units comprised of metal, such as, such as aluminum or copper. If members 56, 58, 60, 62 of arrangements 10, 12, 14 are copper, then the current rating for the overall arrangement of FIG. 1 may be approximately 5,000 amps for 4.25 cross sectional square inches, with approximately 1,200 amps for each cross sectional square inch. If members 56-62 of arrangements 10-14 are aluminum, then the current rating for 4.125 cross sectional square inches may be 3,600 amps with 872 amps for each square inch.

Even through FIG. 3 shows bus bar arrangements 10, 12, 14 as comprising of members 56-62, it is to be noted that less than the total members 56-62 can be used. For instance, some arrangements 10-14 may only consist of one member 56 or two members 56 and 58, or three members 56 and 58 and one of the straight bars 60 or 62, or a variation thereof. The ampere rating for these several arrangements of members 56-62 may range from approximately 1,600 amps to 4,000 amps with approximately 984 amps to 2,020 amps per cross sectional square inch, depending on whether the material is copper or aluminum.

Still referring to FIG. 3, the vertical bus bar arrangements 10, 12, 14 are mounted in cabinet 22 of the switchboard unit by brace units 18, 20, which consist of a pair of horizontal brace members 68, 70. In the usual fashion, the end portions of these braces 68, 70 are secured, as stated hereinbefore, by bolts, two of which are indicated at 72, 74 to a support post 76. Brace member 68 is secured to brace member 70 by a plurality of bolts 69. Even though two brace arrangements 18, 20 are shown in FIG. 1, several pairs of braces 68, 70 may be disposed at vertically spaced intervals along the length of bus bar arrangements 10, 12, 14, in a well-known manner.

Still referring to FIG. 3, brace members 68, 70 are preferably made of sheet metal, such as steel, and are constructed with similar inlet and outlet portions which cooperate to receive the vertical bus bar arrangements 10, 12, 14 and insulator arrangement 54. In a manner similar to that known in the art, brace member 70 has leg portions 71 on both sides for its fastening to support 76. As shown in cross section in FIG. 4, brace members 68, 70 are in a U-configuration. Referring again to FIG. 3, insulator arrangement 54 consists of a pair of horizontal insulator members 78, 80 sandwiched between the surfaces of the vertical bus bar arrangement 10, 12, 14 and the brace members 68, 70.

These insulator members 78, 80, as stated hereinbefore, extend beyond braces 68, 70 along the length of vertical bus bar arrangements 10, 12, 16, as better shown in FIG. 4. These extended portions 82, 84, 86, 88 (FIG. 4) are raised away from the surface of the bus bar arrangements 10, 12, 14 to create an opening for optionally receiving barrier arrangement 16. The opening created by raised portions 82-88 and the external surfaces of bus bars 10-14 is indicated at number 89 in FIG. 4.

Insulator members 78, 80 (FIG. 3) are thin pieces of molded material, preferably glass, which has been reinforced with plastic, and are used to insulate brace members 68, 70 from bus bar arrangements 10, 12, 14. A satisfactory commercial material for insulator members 78, 80 is Nylon 66 glass manufactured by BASF, Plastic Material Division, in Parsippany, N.J.

Each insulator member 78, 80 is of a similar construction and, as shown in FIG. 3, is formed with inlet and outlet portions which fit around bus bar arrangements 10, 12, 14, which overlap at their ends, and which interlock between each phase in a labyrinth fashion to isolate one phase from the other. Projections, one indicated at 90, of insulator members 78, 80 (bus bar 10) extend between members 56, 58 and flat bars 60, 62 of bus bars 10, 12, 14 to aid in separating and positioning flat bars 60, 62 from U-shaped members 56, 58 of vertical bus bar arrangements 10, 12, 14.

Still referring to FIG. 3, the inlet and outlet portions of insulator members 78, 80 interfit with the inlet and outlet portions of brace members 68, 70 of brace arrangements 18, 20.

Still referring to FIG. 3 there is indicated a line side and a load side for bus bar arrangements 10, 12, 14. Also shown in FIG. 3 are posts 92, 94 shown on either side of bar arrangements 10-14. Posts 92, 94 of FIG. 3 support the crossbars, some of which are shown in FIG. 7, and which crossbars are located on the load side of FIG. 3.

Referring again to FIG. 5 there is illustrated a connection for stabs 24, 26, 28 to vertical bus bar arrangements 10, 12, 14. Stabs 24-28 consist of members 96, 98 which have a straight portion 100 extending parallel to and between flat bars 60, 62 and the H-configuration of bus bar arrangements 10, 12, 14. Members 96, 98 converge to form a Y-configuration and abutting sections 110, 112 for the electrical connections to a load center, such as a circuit breaker. Flat bars 60, 62, portions 100, and U-shaped members 56, 58 are bolted together by bolts 114, 116, 118, 120, and nut plates 122, 124, 126, 128, 130, 132. These stab connections of FIG. 5 may be made down along the length of the vertical bus bar arrangements 10, 12, 14, as shown in FIG. 1 on the line side of FIG. 3, and the runback connections 30, 32, 34 are made along the length the bus bar arrangements 10, 12, 14, which may be above these stab connections as shown in FIG. 1. The runbacks 30, 32, 34 preferably, are bars made out of steel, which through openings provided in the H-configuration of bus bar arrangements 10, 12, 14, run from the line side to the load side of FIG. 1. FIG. 6 most clearly illustrates runbacks 30-34 extending in an opening 134 of bus bar arrangements 10-14.

Each of the three phases constituted by bus bar arrangements 10-14 are connected to a series of crossbars at three different locations down along the vertical length of the bus bar arrangements 10-14 in a well-known manner, and on the load side at locations different from the stab connections and the runback connections. Such crossbar connection for phase two is particularly shown in FIG. 7, and consists of crossbars 136, 138, 140, 142, 144, 148, 150 and 152, and electrical tap plates 154, 156, 158 and 160. Plates 154 and 160 extend alongside flat bars 60, 62 respectively. Plates 156 and 158 extend between flat bars 60, 62 respectively, and the U-members 56, 58, and converge with plates 154 and 160, respectively. Plates 154-160 are interconnected to crossbars 136-152 by bolts 162-168, U-shaped nut plates 170, 172, and splice plates 174, 176. Even though not shown, splice plates 174, 176 and nut plates 170, 172 preferably, extend the width of crossbars 136-152. It is apparent that crossbars 136 and 144 are extensions of each other. This holds true also for bars 138, and 148, bars 140 and 150, and bars 142 and 152.

This configuration of FIG. 7 shows a maximum current capacity for phase two. Lower current ratings can be achieved simply by eliminating the number of crossbars 136-152. As discussed hereinbefore, the connection of the crossbars 136-152 to vertical bus bar arrangement 12 occur on the load side of FIG. 1. The same is true for the crossbar arrangements for bus bars 10 and 14.

Figure 8:
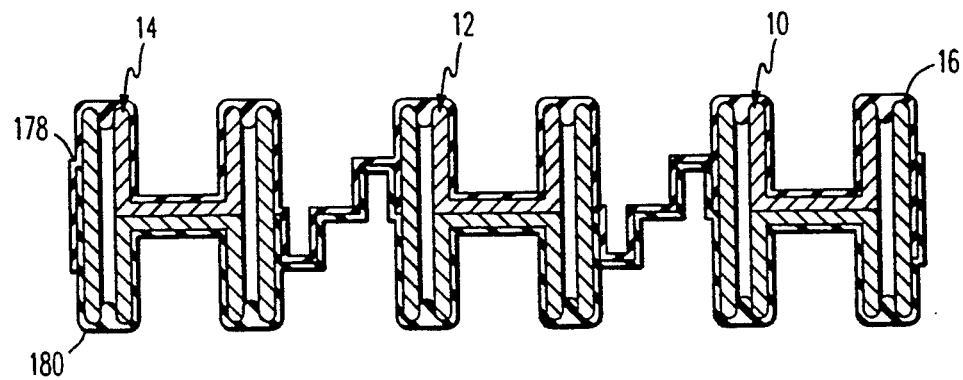
FIG. 8 is an enlarged sectional view taken along lines VIII—VIII of FIG. 1.
Figure 9:
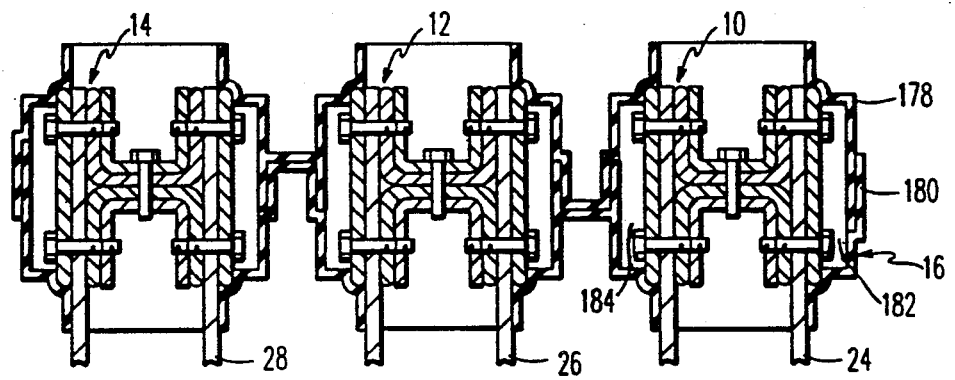
FIG. 9 is an enlarged sectional view taken along lines IX—IX of FIG. 1.
Figure 10:
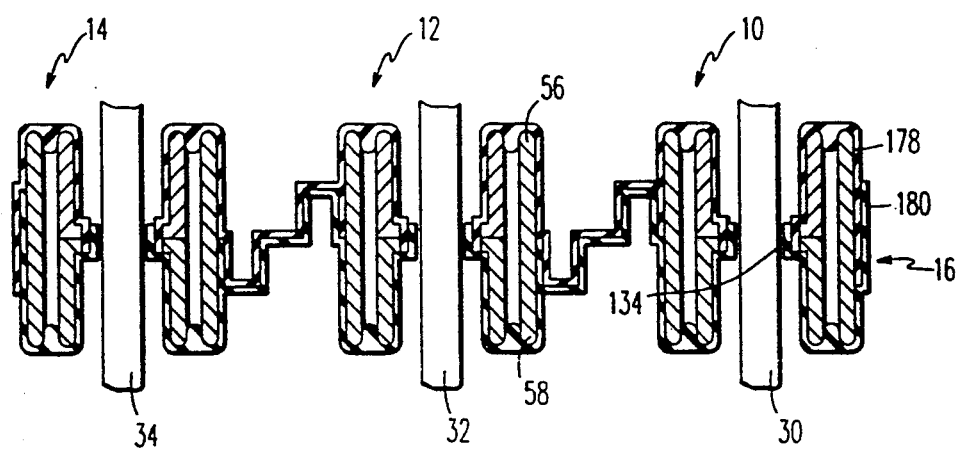
FIG. 10 is an enlarged sectional view taken along lines X—X of FIG. 1.

In order to accommodate the stabs, the runbacks, and the crossbar connections to bus bar units 10, 12, 14, the barrier arrangement 16 of FIG. 1 provides various cross sectional portions along its length. FIG. 8 illustrates a cross section for a great portion of the barrier arrangement 16. FIG. 9 shows a cross section of barrier arrangement 16 for the stab connections 24-26. FIG. 10 shows a cross section of barrier arrangement 16 for the runbacks 30-34. FIG. 10 shows a cross section for the barrier arrangement 16 which may also be used for the crossbar connections of FIG. 7.

As shown in FIGS. 8-10, barrier arrangement 16 consists of two barrier members 178, 180 whose ends overlap, or whose portions have ends which overlap. The portions of barrier members 178, 180 of FIGS. 8 and 10 are constructed with inlet and outlet sections to form a labyrinth between the three phases. This labyrinth configuration between phases is similar to the insulator members 78 and 80 as shown in FIGS. 3 and 8. These labyrinths in FIGS. 8 and 10 are close fitting mazes structured to create a considerable distance between the three phases, as well as to provide interlocking and direct phase barrier protection.

The portions of barrier members 178 and 180 of FIG. 9 are similar in construction, and cooperate to form both an interlocking fit between phases, and clearances, two of which clearances are indicated at 182 and 184 to the right of FIG. 9 for bus bar 10. These clearances 182, 184 are located alongside each vertical bus bar arrangement 10-14 for receiving the bolt heads for the stab connections of stabs 24, 26, 28. The portions of barrier members 178, 180 of FIG. 9 have front and rear areas which can be molded to be easily knocked out for insertion of stabs 24, 26, 28, as shown in barrier 16. These easily knocked out portions are shown in dotted line at the top of FIG. 9. These dotted line areas are shown to be closed in barrier 16, while these dotted line areas for the stab connections 24-28 are shown to be removed in FIG. 9.

These clearances 182 and 184 in FIG. 9 allow the bolt heads and other hardware to be covered by barrier members 178, 180.

The cross section area of barrier arrangement 16 of FIG. 9 may also be provided for the crossbar connections to vertical bus bar arrangements 10-14. In this instance, the dotted line areas on the load side of FIG. 9 would be knocked out to allow for the electrical connections.

As FIG. 10 shows, the portions of barrier members 178 and 180 which allow the runbacks 30, 32, 34 to pass through bus bar arrangements 10-14, are constructed to cover the raw edges of the U-members 56, 58 forming the H-configuration of bus bar units 10-14. The openings 134 in bus bar units 10-14 (FIGS. 6 and 10) are formed by punching a hole through U-shaped members 56-58.

It is to be noted, that even though the barrier arrangement 16 has been shown and discussed herein, this arrangement 16 is optional, and is not necessary for the operation and efficacy of the other aspects of the invention. When barrier arrangement 16 is not used, the raised areas 82-88 of insulator members 78 of FIG. 4 provide the electrical clearances necessary for 600 volt equipment.

As shown in FIG. 1, barrier arrangement 16 does not necessarily have to be continuous and extending the full height of the vertical bus bar units 10-14, but can be sectionalized to be continuous between brace arrangements 18, 20; that is, when viewing FIG. 1, even though not shown, another barrier arrangement can be provided at the top and at the bottom of FIG. 1 for bus bar units 10-14.

Whereas particular embodiments of the invention have been described above for purposes of illustration, it will be evident to those skilled in the art that numerous variations of the details may be made without departing from the invention as defined by the appended claims.

I claim:

1. A power distributing apparatus for supplying electrical power from a power supply source to a load center, said apparatus having a plurality of vertical bus bar means, each bus bar means comprising:
   at least a first conductor member having an intermediate portion and at least two spaced apart leg portions, each said leg portion being continuous to said intermediate portion and extending outwardly in the same direction relative to a plane within which said intermediate portion is located;
   means for electrically connecting said plurality of vertical bus bar means to said power supply source and to said load center;
   support means;
   said vertical bus bar means being mounted to said support means;
   brace means for said mounting of said vertical bus bar means to said support means;
   insulator means disposed between said vertical bus bar means and said brace means;

said insulator means being a thin layer of glass reinforced with plastic for transferring short circuit forces to said brace means;

wherein said first member of said vertical bus bar means is arranged with another first member to form an H-configuration, and further includes a pair of straight members, one of each being disposed alongside and spaced away from said H-configuration on opposed sides of said H-configuration to form each of said vertical bus bar means; and wherein said insulator means substantially encases said each vertical bus bar means.

2. An apparatus of claim 1, wherein said insulator means has a first portion directly in contact with said brace member and with said vertical bus bar means, and a second portion raised away from said vertical bus bar means, along a predetermined length of said vertical bus bar means, and wherein said second portion of said insulator means extends beyond said brace means along said predetermined length of said vertical bus bar means.

3. An apparatus center of claim 2, further comprising barrier means disposed adjacent to said brace means along the length of said each vertical bus bar means for contacting and encasing said vertical bus bar means, and wherein said barrier means has a portion extending beneath said second portion of said insulator means.

4. An apparatus of claim 3, further comprising at least three said vertical bus bar arrangements to form three phases for said system.

5. An apparatus of claim 4, further comprising runback means, and wherein said vertical bus bar means further consists of insulated aperture means through which said runback means extends through said vertical bus bar means.

6. A power distributing apparatus for supplying electrical power from a power supply source to a load center, said apparatus having a plurality of vertical bus bar means, each bus bar means comprising:

at least a first conductor member having an intermediate portion and at least two spaced apart leg portions, each said leg portion being continuous to said intermediate portion and extending outwardly in the same direction relative to a plane within which said intermediate portion is located;

means for electrically connecting said plurality of vertical bus bar means to said power supply source and to said load center;

wherein said first member of said vertical bus bar means is arranged with another fist member to form an H-configuration, and said vertical bus bar means includes a pair of straight members, one of each being disposed alongside and spaced away from said H-configuration to form a gap on opposed sides of said H-configuration; and further comprising stab means having two spaced apart extensions, each said extension fitting into said gap between a respective straight member and said H-configuration of said vertical bus bar means.

7. An apparatus of claim 6, further comprising crossbar means disposed on a side opposite to said stab means, being electrically connected to said vertical bus bar means, and consisting of at least one crossbar for generating and carrying a desired current rating for said vertical bus bar means.

8. An apparatus of claim 7, wherein said crossbar means is made of copper.

9. An apparatus of claim 8, wherein said crossbar means is made of aluminum.

10. A power distributing apparatus for supplying electrical power from a power supply source to a load, said apparatus having vertical bus bar means comprising:

two U-shaped conductor members secured together to form an H-configuration, planar conductor means spaced away from said U-shaped members to form a gap therebetween;

tap means extending into said gap and contacting said two conductors and said planar conductor of said bus bar means, and crossbar means extending transversely to said vertical bus bar means and electrically connected to said tap means.

11. An apparatus of claim 10 wherein said tap means comprises:

first connector means extending into said gap formed by said U-shaped members and said planar member, and having leg means which engages said conductors of said bus bar means and flange means perpendicular to said leg means and parallel to and secured to said crossbar means.

12. An apparatus of claim 11, further comprising:

second connector means having leg means which engages said planar member and flange means parallel to said flange means of said first connector means and secured to said crossbar means.

* * * * *